No. 621,052. Patented Mar. 14, 1899.
F. G. A. FIELITZ.
VALVE FOR AIR BRAKE SYSTEMS.
(Application filed Feb. 25, 1898.)
(No Model.)

Witnesses:
F. G. Fischer
G. F. Thorpe

Inventor:
Fredrich G. A. Fielitz
By Higdon & Higdon
attys.

THE NORRIS PETERS CO., PHOTO-LITHO., WASHINGTON, D. C.

UNITED STATES PATENT OFFICE.

FREDRICH G. A. FIELITZ, OF ARMOURDALE, KANSAS.

VALVE FOR AIR-BRAKE SYSTEMS.

SPECIFICATION forming part of Letters Patent No. 621,052, dated March 14, 1899.

Application filed February 25, 1898. Serial No. 671,619. (No model.)

*To all whom it may concern:*

Be it known that I, FREDRICH G. A. FIELITZ, of Armourdale, Wyandotte county, Kansas, have invented certain new and useful Improvements in Valves for Air-Brake Systems, of which the following is a full, clear, and exact description, reference being had to the accompanying drawings, forming a part thereof.

My invention relates to automatic air-brake systems, and more particularly to a valve or cock whereby the brakes of the driver or locomotive may be controlled independently of the brakes of the train, to the end that certain results hereinafter referred to may be accomplished.

With this object in view the invention consists in certain novel and peculiar features of construction and arrangement, as will be hereinafter described.

In order that the invention may be fully understood, I will proceed to describe it with reference to the accompanying drawings, in which—

Figure 1:
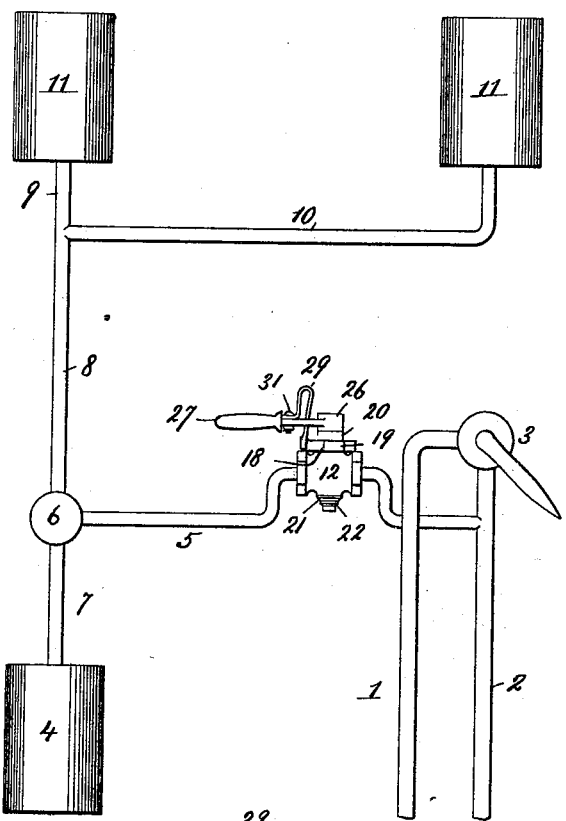
Figure 2:
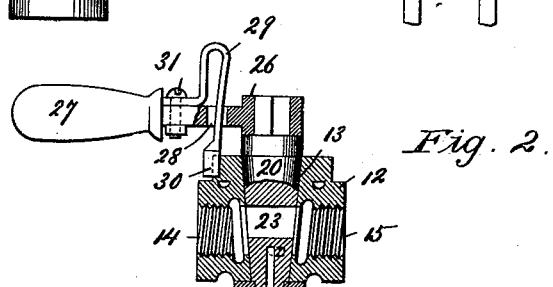
Figure 3:
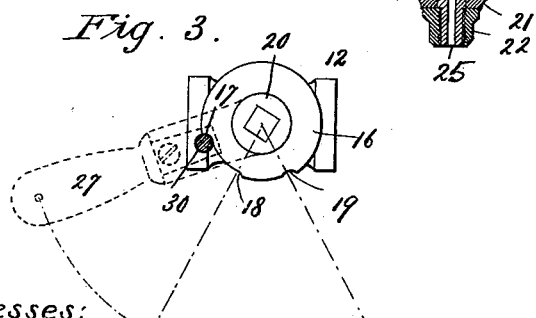
Figure 4:
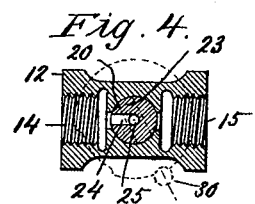

Figure 1 represents a plan view of a part of the air-brake system embodying my improved valve. Fig. 2 is a vertical section which illustrates the internal construction of said valve. Fig. 3 is a horizontal section of the same. Fig. 4 is a horizontal section of the same, taken in a lower plane than Fig. 3.

In the said drawings, 1 designates the main reservoir-pipe of the air-brake system.

2 designates the train line-pipe, and 3 the brake-valve, located in the cab of the locomotive (not shown) and under the control of the engineer. 4 designates the auxiliary reservoir on the locomotive. 5 designates a pipe which connects the train line-pipe through the medium of the triple valve 6 and pipe 7 with said auxiliary cylinder. 8 designates a pipe connecting also with the triple valve and provided with branch pipes 9 and 10 in communication with the driver-brake cylinders 11. The parts just described are common in automatic air-brake systems and to them no claim is made.

12 designates the casing of my improved valve, said casing being provided with the inverted conical passage 13 and longitudinal passages 14 and 15 communicating therewith and secured upon the pipe or pipe-sections 5. The casing is also provided at its top with a horizontal disk portion 16, provided with seats 17, 18, and 19, for a purpose to be hereinafter described.

20 designates the conical valve journaled in the conical opening 13 and projecting through and upon the washer 21 and the tap or nut 22, which latter is secured upon the threaded lower end of the valve and clamps the washer firmly up against the bottom of the casing. Said valve is provided at its middle with a passage 23, which normally establishes communication between the passages 14 and 15, and consequently between the train-pipe 2 and the triple valve 6. Below the passage 23 is an angular passage comprising the horizontal portion 24, extending at an angle to the passage 23 and adapted to communicate with the passage 14 of the valve-casing at times, and the vertical portion 25, which extends vertically downward through the stem of the valve and communicates with the outside air. The relative dimensions and positions of these passages with respect to each other and to the valve 20 are such that the latter, as shown in Fig. 2, may open up communication between the passages 14 and 15 or cut off such communication entirely, so as to prevent the air passing from the pipe 5 at either side of the valve into the same, or may cut off communication between the passages 14 and 15 and at the same time establish communication between said passage 14 and the passage 24 25.

26 designates a lever mounted as shown or in any other suitable manner upon the upper end of the valve, and 27 a handle for the lever. The lever is provided with an opening 28, through which depends a spring-arm and a dog or pawl 29, said dog or pawl being provided with a vertical cylindrical tooth 30 to bear with a yielding pressure against the disk 16 of the casing and to engage one of the notches or seats 17, 18, or 19, accordingly as it is desired to hold the valve in one of the three positions hereinbefore explained. The dog 29 is preferably secured to the lever by means of the bolt 31 or its equivalent. When the dog engages the notch or seat 17, (see Fig. 3,) the passage 23 of the valve connects the passages 14 and 15, so that the manipulation of the brake-valve 3 produces the usual effect—that is to say, it causes the application of the brakes on the entire train, including the locomotive or driver, and also the release of the same accordingly as it is operated in one direction or the other. When the dog 17 engages the notch or seat 18, the valve shuts off communication between the passages 14 and 15 and prevents air escaping by way of the valve from either section of the pipe 5 in order that the operation of the brake-valve 3 to apply or release the brakes of the train will have no effect upon the driver-brakes. After the train-brakes are applied in the usual manner the driver-brakes may also be applied, if desired, by manipulating the lever 26 and causing the angular opening 24 25 to register with the passage 14, which obviously permits the pressure in the pipe 5 to fall and causes the operation of the triple valve and the consequent application of the driver-brakes.

Supposing the brakes of the entire train to be released, with the valve 20 in the position shown in Fig. 2 most clearly, and it be desired to apply the brakes on the locomotive without applying the train-brakes, it is only necessary to swing the lever to the position indicated by dotted lines in Fig. 4 and open up connection between passage 14 and valve-passage 24 25. Immediately this takes place, as above explained, the pressure of the air in pipe 5 on triple valve 6 is lowered, and the latter automatically operates and causes the application of the drive-brakes.

The individual functions of my improved valve outlined above are important, in that by controlling the application of the driver-brakes independently of the train-brakes more perfect control of the train by the engineer is insured. To illustrate, we will suppose that a train is descending a long slope and that at the base of the slope there is a crossing and some hundred yards above the crossing a station at which the train must stop. By the time the train reaches said station it has expended, say, fifty or sixty pounds of air. The brakes are now applied, and as it is impossible to restore the pressure while in such condition it is obvious that it would be almost impossible to stop the train again short of the crossing, provided the crossing, of course, is reached within the time required to restore the pressure. It is obvious, therefore, that a serious accident is liable to occur because of the fact that the brakes are not in a condition to be applied. With my improved valve in position, however, as soon as the descending train is stopped at the station, with the brakes of the driver as well as the train applied, the lever 26 is thrown to the position shown in Fig. 4 to hold the driver-brakes in operative position and the brake-valve operating to release the brakes on the remainder of the train, the driver-brakes being sufficient to hold the train after its momentum is checked. While transferring passengers or freight or taking on coal or water the pressure in the train-brakes can be restored, so that they will be in condition to operate with full effect in case it is necessary to stop the train again before the bottom of the grade is reached, as will be readily understood.

As the fore or descending part of the train overbalances the rear or ascending portion after passing the crest of a hill, it is customary for the engineer to set the brakes to prevent too great a momentum, and by so doing the strain upon the couplings is so great, due to the weight of the rear cars and the friction engendered by applying the brakes thereto, that a coupling frequently breaks at the top of the hill, which of course is extremely dangerous to the occupants of the rear portion of the train, as well as of a train approaching from the rear on the same track, without taking into consideration the injury to the train and freight or other property therein. With my improved valve in position this trouble can be prevented in large measure by simply applying the brake on the driver or locomotive alone after the crest of the hill is passed, this being sufficient to prevent too great a speed and relieving the couplings of the extraordinary strain imposed by the application of brakes on the ascending cars or coaches.

The traveling public at present is forcibly reminded of the fact that the train is going to stop, because as the brakes are applied there is more or less shock or jar due to the fact of the bumping of the cars against each other caused by a slight misjudgment on the part of the engineer, who applied the brakes a little too soon and in order to bring the train up to the platform at the proper point released them slightly and again applied them at the proper time. By the proper manipulation of my valve this trouble can in a large measure be prevented.

Having thus described my invention, what I claim as new, and desire to secure by Letters Patent, is—

The combination with the engine auxiliary reservoir 4, brake-cylinders 11, triple valve 6, engineer's valve 3, and pipes 1 and 2, communicating with the main reservoir and the train-pipe respectively, of a pipe 5, connecting the triple valve with pipe 2, and a valve consisting of a casing 12, having passages 14 15, a plug or valve proper provided with passages 23 and 24 25, a handle for adjusting said plug, and means to secure the plug in any position desired, substantially as described.

In testimony whereof I affix my signature in the presence of two witnesses.

FREDRICH G. A. FIELITZ.

Witnesses:
G. Y. THORPE,
M. R. REMLEY.